(12) United States Patent
Wendlandt

(10) Patent No.: US 6,614,032 B2
(45) Date of Patent: Sep. 2, 2003

(54) COMPUTED RADIOGRAPHY CASSETTE WITH X-RAY TRANSMISSIVE EDGES

(75) Inventor: William C. Wendlandt, Rush, NY (US)

(73) Assignee: Eastman Kodak Company, Rochester, NY (US)

( * ) Notice: Subject to any disclaimer, the term of this patent is extended or adjusted under 35 U.S.C. 154(b) by 63 days.

(21) Appl. No.: 10/012,120

(22) Filed: Dec. 3, 2001

(65) Prior Publication Data

US 2003/0102439 A1 Jun. 5, 2003

(51) Int. Cl.$^7$ .............................................. G03B 42/04
(52) U.S. Cl. ...................... 250/484.4; 206/455
(58) Field of Search .................... 250/484.4; 378/182; 206/455

(56) References Cited

U.S. PATENT DOCUMENTS

| | | | |
|---|---|---|---|
| 4,827,136 A | * | 5/1989 | Bishop et al. ............ 250/484.4 |
| 4,961,000 A | * | 10/1990 | Finkenzeller et al. ..... 250/484.4 |
| 5,025,465 A | * | 6/1991 | Bauer et al. .............. 250/484.4 |
| 5,065,866 A | * | 11/1991 | Boutet et al. ............. 250/484.4 |
| 5,070,248 A | * | 12/1991 | Pesce ........................... 378/182 |
| 5,276,333 A | | 1/1994 | Robertson ................. 250/484.4 |
| 6,191,426 B1 | * | 2/2001 | Hayakawa et al. ....... 250/484.4 |

FOREIGN PATENT DOCUMENTS

EP    919 856 A1    6/1999

* cited by examiner

*Primary Examiner*—Christopher W. Fulton
(74) *Attorney, Agent, or Firm*—William F. Noval

(57) ABSTRACT

A computed radiography cassette comprising: a five sided open-ended shell including upper and lower spaced panels, and first and second side members and a front end member which extend between and join said upper and lower panels on three sides, at least one of said first and second side members and said front end member being of x-ray transmissive material, and a storage phosphor assembly including a back end member, an insert plate having an upper face and being cantilevered from said back end member, and an x-ray storage phosphor disposed on said upper face of said insert plate.

8 Claims, 6 Drawing Sheets

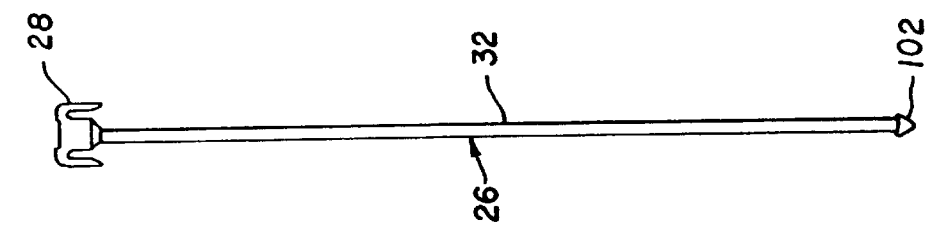
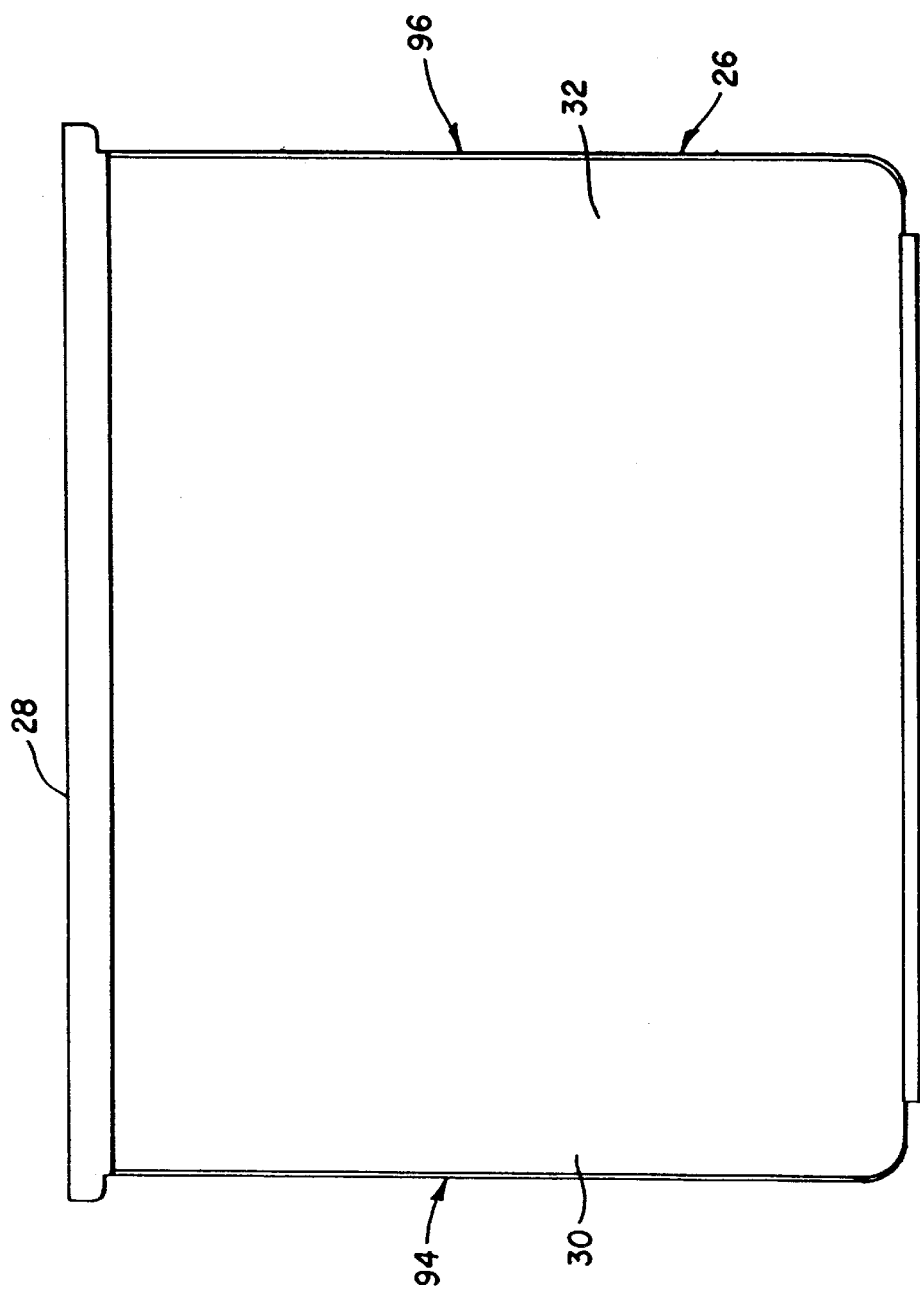

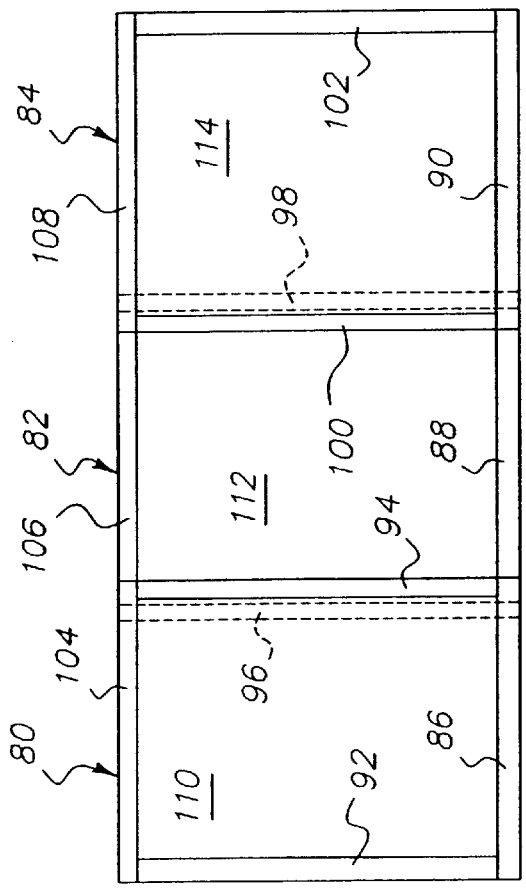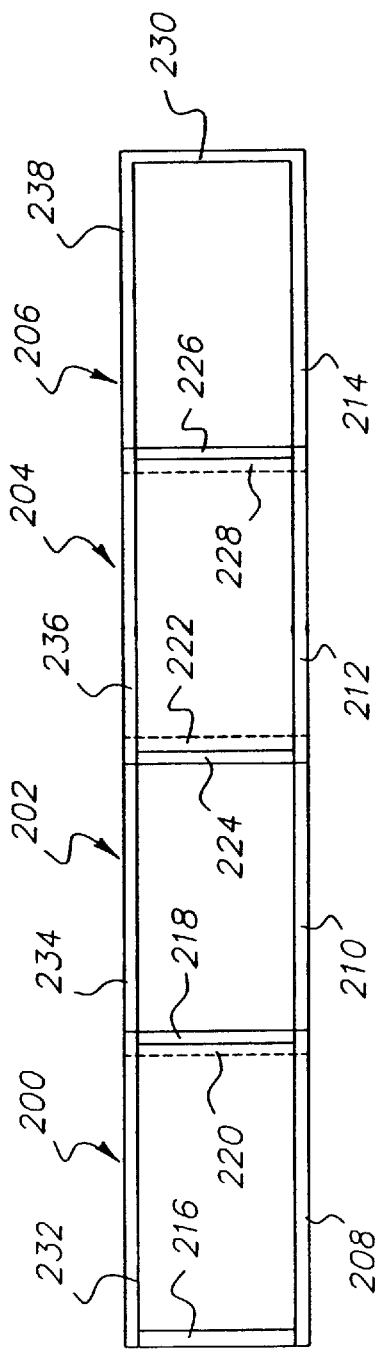
FIG. 6
FIG. 7

COMPUTED RADIOGRAPHY CASSETTE WITH X-RAY TRANSMISSIVE EDGES

FIELD OF THE INVENTION

This invention relates in general to computed radiography and more particularly to a computed radiography cassette system for capturing x-ray images of elongated objects such as the spine or legs.

BACKGROUND OF THE INVENTION

In computed radiography (CR) a storage phosphor is exposed to an x-ray image (radiographic image) of an object, such as a human body part to produce a latent radiographic image stored in the storage phosphor. The storage phosphor is provided to a CR reader where the storage phosphor is stimulated with light of one frequency to emit a radiographic light image of a second frequency. The radiographic light image is converted to a digital radiographic image which can be stored, displayed, activated or printed out on visual media (film). The storage phosphor is conventionally supported in a light tight cassette to protect the storage phosphor from damage and to prevent exposure to ambient light.

U.S. Pat. No. 5,276,333, issued Jan. 4, 1994, inventor Robertson, discloses a CR cassette including a shell and a storage phosphor assembly removably mounted in the shell. The shell includes upper and lower spaced panels and first and second side members and a front end member which extends between and close off said upper and lower panel on three sides. The storage phosphor assembly includes a back end member, an insert plate having an upper face and being cantilevered from said back end member, and an x-ray storage phosphor disposed on said upper face of said insert plate. The back end member closes off the open end of said shell to provide a light tight enclosure for said x-ray storage phosphor. The side members, front end member, and back end member are made of extruded aluminum and provide a relatively rigid aluminum frame for the CR cassette. The storage phosphor is totally within the inner perimeter created by the aluminum framing due to the fact that the aluminum framing has a relatively high degree of x-ray absorption compared to the upper panel which is of x-ray transmissive material, and would thus be visible if an x-ray image were exposed on the storage phosphor.

Full spine and full leg radiographic examinations require x-ray images that are longer than the length of conventional radiographic storage phosphor which include the following sizes: 18 cm.×24 cm., 24 cm.×30 cm., 35 cm.×35 cm., and 35 cm.×43 cm., the latter being the largest conventional size. For full spine or full leg radiography, x-ray images of 100 cm. or more need to be provided for.

European Patent application EP 0919 856A 1, published Jun. 2, 1999, inventors Dewaele et al., discloses one solution to this problem in which a plurality of computed radiography cassettes are held in a staggered, overlapping arrangement so that the length of the staggered arrangement is at least equal to the length of the elongated body part. There is no disclosure in this European Patent application of a solution to the problem of x-ray imaging of overlapping cassette side and end members which are x-ray absorptive.

SUMMARY OF THE INVENTION

According to the present invention, there is provided a solution to the problems discussed above.

According to a feature of the present invention, there is provided a computed radiography cassette comprising:

a five sided open-ended shell including upper and lower spaced panels, and first and second side members and a front end member which extends between and join said upper and lower panels on three sides, at least one of said first and second side members and said front end member being of x-ray transmissive material, and a storage phosphor assembly including a back end member, an insert plate having an upper face and being cantilevered from said back end member, and an x-ray storage phosphor disposed on said upper face of said insert plate.

ADVANTAGEOUS EFFECT OF THE INVENTION

The invention has the following advantages.

1. Insignificant design changes to the conventional CR cassette are required.
2. Elongated objects such as long body parts (spine, leg) can be captured on overlapped CR cassettes without capture of undesirable images of CR cassette members.
3. No changes are required to conventional x-ray equipment or CR readers.
4. X-ray transmissive material for cassette perimeter members offer a cost and weight advantage. Where plastic is used, it can be extruded in many different colors for cosmetic apperance changes to the cassette.
5. The cassette can be used to image very close to a body part such as the chest wall in mammography.

BRIEF DESCRIPTION OF THE DRAWINGS

FIG. 3 is a top plan view of the storage phosphor assembly of the cassette of FIG. 1.

FIG. 4 is a side elevational view of the assembly of FIG. 3.

FIGS. 6, 7 and 8 are diagrammatic views of computed radiography cassette systems according to the invention.

DETAILED DESCRIPTION OF THE INVENTION

Figure 1:
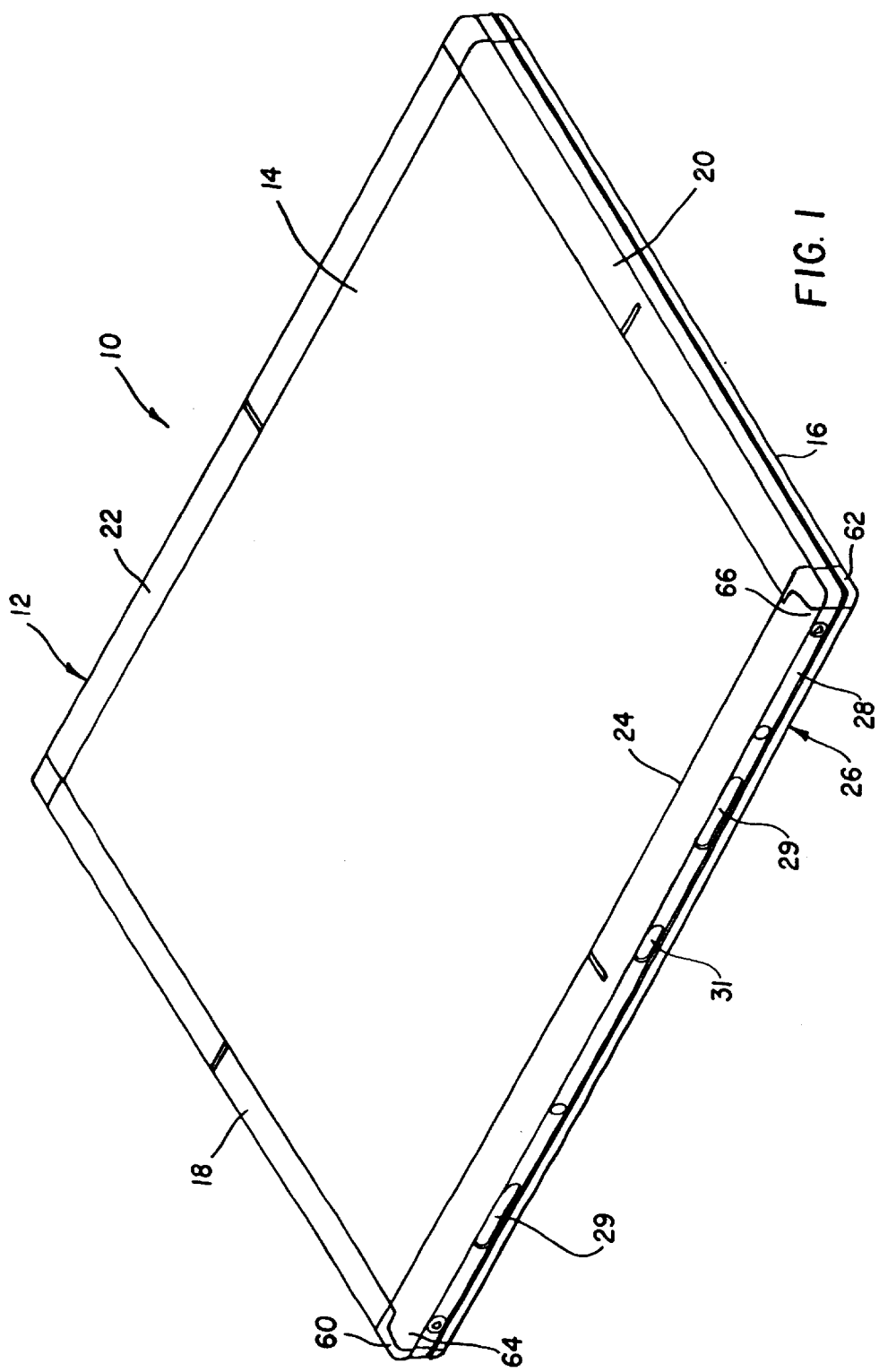
FIG. 1 is a perspective view of a computed radiography cassette according to the present invention.
Figure 2:
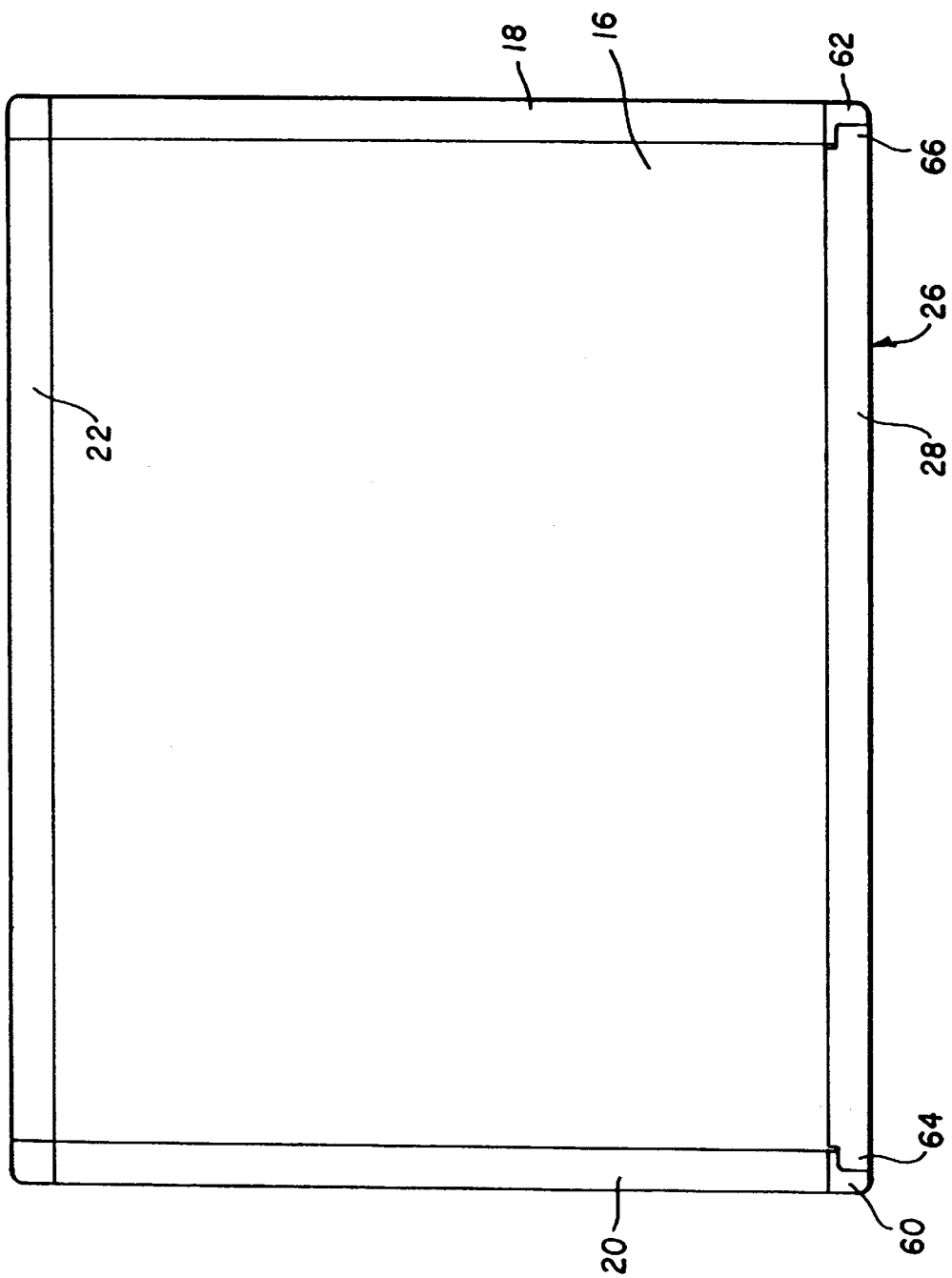
FIG. 2 is a bottom plan view of the cassette of FIG. 1.

Referring now to the drawings there will be described the present invention. As shown in FIGS. 1–4, computed radiography cassette 10, includes a shell 12 including upper and lower rectangular panels 14 and 16, first and second side members 18 and 20, and a front end member 22. Members 18, 20, 22 join panels 14, 16 to form a five-sided cavity having an open end 24. Cassette 10 also includes a storage phosphor assembly 26 including a back end member 28, an insert plate 30 having an upper face and being cantilevered from said back end member 28 (FIG. 4), and an x-ray storage phosphor 32 disposed on said upper face of plate 30. Member 28 includes apertures 29, 31 for access to the interior of member 28 to latch and unlatch a latch bar slidably mounted therein. (See: U.S. Pat. No. 5,276,333, issued Jan. 4, 1994, inventor Robertson for a more detailed description of such a latch/unlatch assembly).

Shell side members 18 and 20, respectively, have corner structures 60, 62 which engage end portions 64, 66 of member 28. The L-shaped configuration of structures 60, 62 and end portions 64, 66 distribute forces if cassette 10 is dropped, to prevent jamming of the latch/unlatch assembly.

Edge guards 94, 96 and front edge 102 provide a bumper system to absorb and distribute forces on plate 30.

Figure 5:
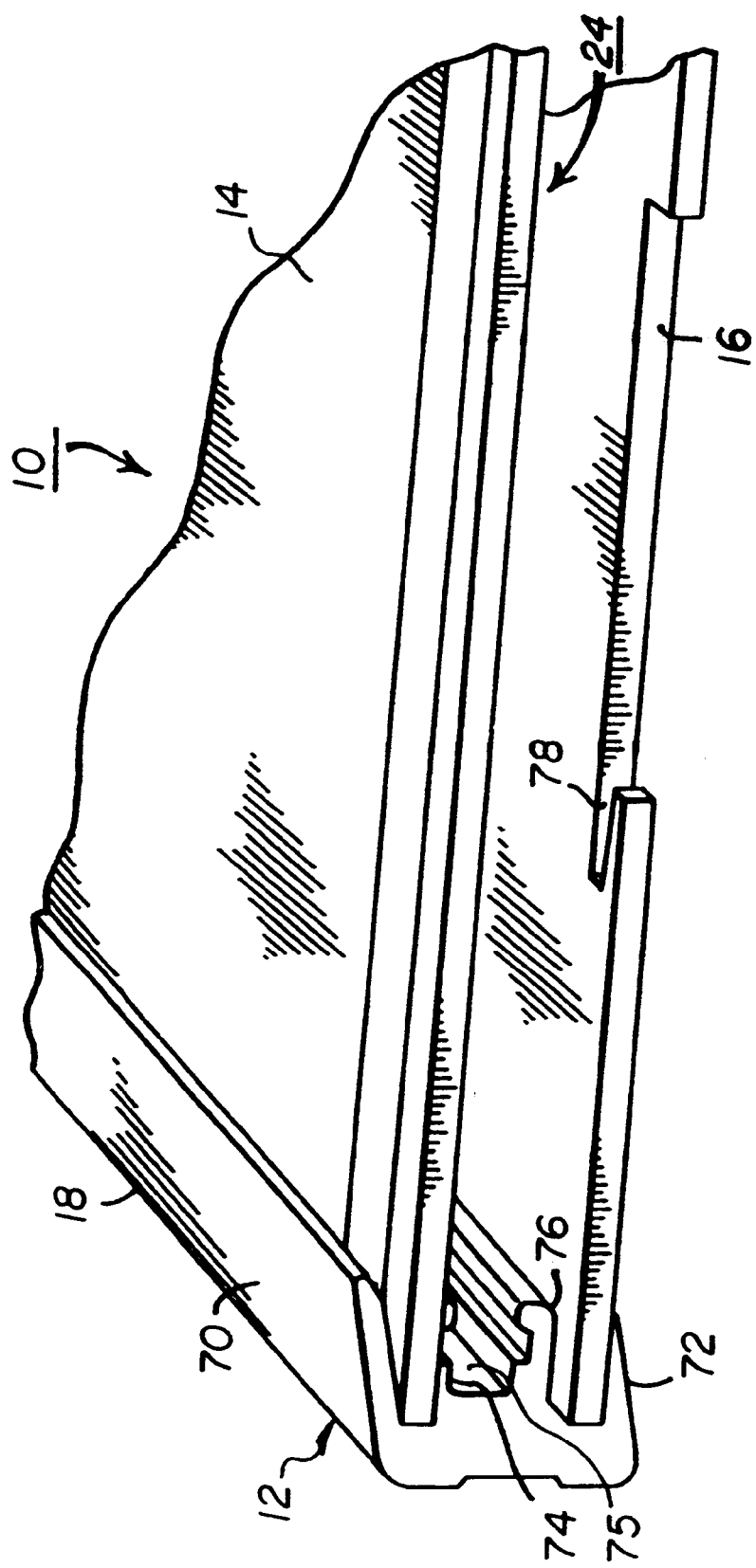
FIG. 5 is an enlarged fragmentary view of the shell of the cassette of FIG. 1.

FIG. 5 shows in greater detail components of shell 12 of cassette 10. Side member 18 has a central recess 75, outside flanges 70, 72 and inside flanges 74, 76 which join to upper and lower panels 14,16. Lower panel 16 has notched areas 78 for engaging the latch assembly in member 28.

According to the present invention, one or more of side members 18, 20 and front end member 22 are made of x-ray transmissive material, such as polymeric material instead of the x-ray opaque aluminum used in the CR cassettes disclosed in U.S. Pat. No. 5,276,333. The difficulties encountered in stacking cassettes with aluminum side and front end members for capturing elongated x-ray images are minimized, since the x-ray transmissive perimeter members will not be imaged on the overlapped storage phosphors contained in the stacked cassettes. Moreover, the storage phosphor within the cassette can be extended to the cassette wall for use in applications, such as mammography.

In order to acquire x-ray images of an elongated object, such as the spine or whole leg, two or more CR cassettes according to the invention are overlapped so that the storage phosphors contained in the cassettes overlap. Such a computed radiography cassette system minimizes x-ray imaging of the x-ray transmissive side and end members onto the overlapped storage phosphors.

FIG. 6 illustrates a CR cassette system including three overlapped CR cassettes 80, 82, 84 according to the invention. As shown, CR cassette 80 has a back end member 86 containing the latch/unlatch assembly, x-ray transmissive side members 92, 94 and front end member 104 can be either x-ray transmissive or x-ray opaque. Similarly, CR cassette 106 includes back end member 88, x-ray transmissive side members 96, 98 and front end member 106 and CR cassette 84 includes back end member 90, x-ray transmissive side members 100, 102 and front end member 108. CR cassettes 80, 84 overlap CR cassette 82. Respective upper panels 110, 112, 114 of cassettes 80, 82, 84 are x-ray transmissive as are side members 94, 100 respectively of cassettes 80, 84. Thus, an elongated x-ray image projected through panels 110, 112, 114 and side members 94, 100 onto the overlapped storage phosphors contained in cassettes 80, 82, 84 will not produce x-ray images of members 94, 100 on the storage phosphors. This feature greatly reduce degradation of the stored elongated x-ray image.

While FIG. 6 illustrates stacked cassettes wherein the long sides of the cassettes are overlapped, FIG. 7 illustrates a CR cassette system according to the invention where the latch assembly containing back end is a long dimension and the short sides of CR cassettes are overlapped. As shown, cassettes 200, 202, 204, 206 are shown overlapped having respective latch assembly back end members 208, 210, 212, 214, respective side members 216 and 218, 220 and 222, 224 and 226, 228 and 230, and respective front end members 232, 234, 236, 238. Side members 216–230 are of x-ray transmissive material.

Figure 8:
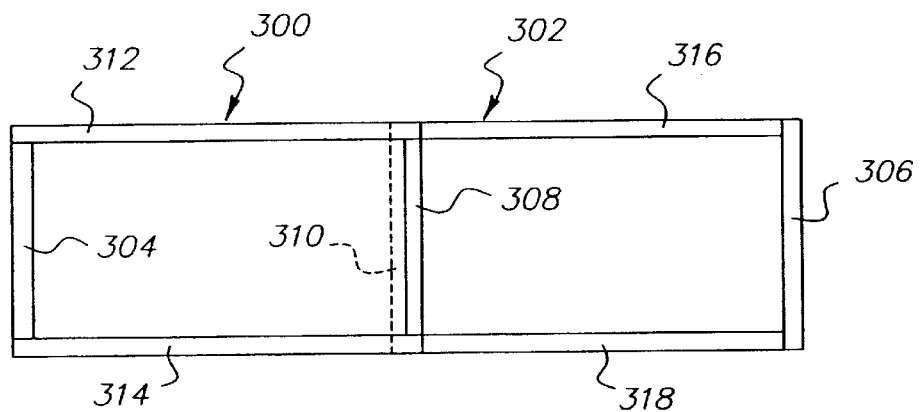

FIG. 8 illustrates a CR cassette system where two CR cassettes are overlapped end to end. In such case, the front end members are of x-ray transmissive material and the side members are preferably but not necessary of x-ray transmissive material. As shown, CR cassettes 300, 302 include latch assembly back end members 304, 306, front end members 308, 310, and side members 312 and 314, and 316 and 318. Front end members 308, 310 are of x-ray transmissive material.

Figure 9:
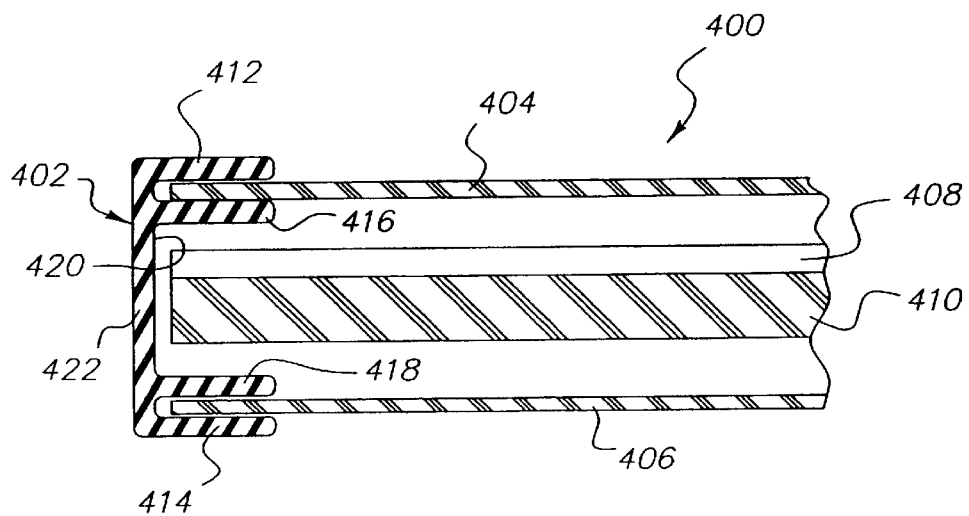
FIG. 9 is a cross-sectional, partial view of another embodiment of the present invention.

FIG. 9 shows another embodiment of the present invention. As shown, CR cassette 400 includes a front end member 402, upper panel 404, lower panel 406, storage phosphor 408 disposed on insert plate 410. Front end member 402 is made of x-ray transmissive material and has outer flanges 412, 414, inner flanges 416, 418 and channel 420 with front wall 422 between flanges 416, 418. Because flanges 412, 416 are of x-ray transmissive material, storage phosphor 408 on the plate 410 extends to the front wall 422 of member 402. This feature is advantageous in applications, such as mammography, where cassette 400 is located in contact with the chest wall of a patient. The extension of storage phosphor 408 under flanges 412, 416 allows more complete x-ray imaging of the patient's breast.

The invention has been described in detail with particular reference to certain preferred embodiments thereof, but it will be understood that variations and modifications can be effected within the spirit and scope of the invention.

| PARTS LIST | |
|---|---|
| 10 | computed radiography cassette |
| 12 | shell |
| 14 | upper rectangular panel |
| 16 | lower rectangular panel |
| 18 | first side member |
| 20 | second side member |
| 22 | front end member |
| 24 | open end |
| 26 | storage phosphor assembly |
| 28 | back end member |
| 29 | aperture |
| 30 | upper face plate |
| 31 | aperture |
| 32 | x-ray storage phosphor |
| 60,62 | corner structures |
| 64,66 | end portions |
| 70,72 | outside flanges |
| 74 | inside flange |
| 75 | central recess |
| 76 | inside flange |
| 80–84 | overlapped CR cassettes |
| 86–90 | back end member |
| 92–102 | x-ray transmissive side members |
| 104 | front end member |
| 106 | CR cassette |
| 108 | front end member |
| 110–114 | panel |
| 200–206 | cassettes |
| 208–214 | latch assembly back end member2 |
| 216–230 | side members |
| 232–238 | front end members |
| 300 | CR cassette |
| 302 | CR cassette |
| 304,306 | latch assembly back end member |
| 308,310 | front end members |
| 312–318 | side members |
| 400 | CR cassette |
| 402 | front end member |
| 404 | upper panel |
| 406 | lower panel |
| 408 | storage phosphor |
| 410 | insert plate |
| 412,414 | outer flange |
| 416,418 | inner flanges |
| 420 | channel |
| 422 | front wall |

What is claimed is:

1. A computed radiography cassette comprising:
   a five sided open-ended shell including upper and lower spaced panels, and first and second side members and a front end member which extend between and join said upper and lower panels on three sides, at least one of said first and second side members and said front end member being of x-ray transmissive material; and a storage phosphor assembly including a back end member, an insert plate having an upper face and being cantilevered from said back end member, and an x-ray storage phosphor disposed on said upper face of said insert plate.

2. The cassette of claim 1 wherein said first and second side members are of x-ray transmissive material.

3. The cassette of claim 1 wherein said front end member is of x-ray transmissive material.

4. The cassette of claim 1 wherein said first and second side members and said front end member are of x-ray transmissive material.

5. The cassette of claim 3 wherein said front end member includes an inwardly projecting flange structure which is joined to said upper panel and also includes a front wall, and wherein said storage phosphor extends to said front wall below said flange structure, so that an x-ray image freely passes through said flange structure to said storage phosphor without storing an x-ray image of said flange structure in said storage phosphor.

6. A computed radiography cassette system for capturing elongated radiographic images, comprising:

first and second computed radiography cassettes, wherein each of said cassettes includes a shell and a storage phosphor assembly, said shell including a five-sides open-ended shell including upper and lower spaced panels, and first and second side members and a front end member which extend between and join said upper and lower panels on three sides at least said first and second side members being of x-ray transmissive material; and said storage phosphor assembly including a back end member, an insert plate having an upper face and being cantilevered from said back end member, and an x-ray storage phosphor disposed on said upper face of said insert plate, wherein said-storage phosphor assembly is removably mounted in said shell such that said back end member closes off said open end of said shell;

wherein said first and second cassettes are positioned in overlapping relationship such that said side members are overlapping, such that said storage phosphors are overlapping and such that said radiation transmissive first and second side members freely pass x-rays to said overlapping storage phosphors with minimal imaging of said side members on said storage phosphors.

7. The system of claim 6 including a third computed radiography cassette which includes a shell and a storage phosphor assembly constructed as said first and second computed radiography cassettes;

wherein said third computed radiography cassette is positioned in overlapping relationships with said first or said second computed radiography cassette.

8. The system of claim 7 including a fourth computed radiography cassette which includes a shell and a storage phosphor assembly constructed as said first and second computed radiography cassettes;

wherein said fourth computed radiography cassette is positioned in sequential overlapping relationship with said first, said second and said third computed radiography cassettes.

* * * * *